United States Patent
Dong (10) Patent No.: US 11,764,569 B2
(45) Date of Patent: Sep. 19, 2023

(54) ELECTRICAL SURGE PROTECTION CIRCUITS

(71) Applicant: ZHEJIANG DAHUA TECHNOLOGY CO., LTD., Zhejiang (CN)

(72) Inventor: Liangyun Dong, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/645,983

(22) Filed: Dec. 25, 2021

(65) Prior Publication Data

US 2022/0123549 A1  Apr. 21, 2022

Related U.S. Application Data

(63) Continuation of application No. PCT/CN2020/082124, filed on Mar. 30, 2020.

(30) Foreign Application Priority Data

Jul. 2, 2019 (CN) .......................... 201910587726.2
Jul. 2, 2019 (CN) .......................... 201910596669.4

(51) Int. Cl.
  *H02H 9/04* (2006.01)
  *H02H 9/00* (2006.01)
  *H02H 9/06* (2006.01)

(52) U.S. Cl.
  CPC .............. *H02H 9/005* (2013.01); *H02H 9/00* (2013.01); *H02H 9/04* (2013.01); *H02H 9/041* (2013.01); *H02H 9/046* (2013.01); *H02H 9/06* (2013.01)

(58) Field of Classification Search
  CPC ............ H02H 9/00; H02H 9/005; H02H 9/04; H02H 9/041; H02H 9/06; H02H 9/043;
  (Continued)

(56) References Cited

U.S. PATENT DOCUMENTS 8,013,466 B1* 9/2011 Thompson ............... H02J 1/00
                                                          713/300
2003/0072121 A1 4/2003 Bartel et al.
(Continued)

FOREIGN PATENT DOCUMENTS

CN    2790007 Y    6/2006
CN    101383508 A  3/2009
(Continued)

OTHER PUBLICATIONS

International Search Report in PCT/CN2020/082124 dated Jun. 30, 2020, 5 pages.
(Continued)

*Primary Examiner* — Danny Nguyen
(74) *Attorney, Agent, or Firm* — METIS IP LLC (57) ABSTRACT

The present disclosure provides a circuit including a coaxial cable interface, a data module, a power module, a power signal transmission branch, and a data signal transmission branch. The data module may receive or output a data signal. The power module may receive or output a power signal. The power signal transmission branch may be electrically coupled between the coaxial cable interface and the power module, and may include an inductor that allows the power signal to pass. The data signal transmission branch may be electrically coupled between the coaxial cable interface and the data module, and may include a capacitor that allows the data signal to pass and a first electrical surge protection circuit. The first electrical surge protection circuit may release a surge current on the data signal transmission branch.

19 Claims, 6 Drawing Sheets

(58) Field of Classification Search
CPC . H04B 3/00; H04B 3/54; H04B 3/548; H04B 3/56
USPC .......................................... 361/91.1, 117–120
See application file for complete search history.

(56) References Cited

U.S. PATENT DOCUMENTS

| | | |
|---|---|---|
| 2005/0111154 A1 | 5/2005 | Baughan |
| 2007/0002511 A1 | 1/2007 | Chaudhry |
| 2008/0080116 A1 | 4/2008 | Qin et al. |
| 2010/0265626 A1 | 10/2010 | Qin et al. |
| 2013/0187445 A1 | 7/2013 | Mutzabaugh |
| 2015/0077889 A1* | 3/2015 | Kauffman .............. H03H 7/075 361/56 |
| 2018/0210854 A1* | 7/2018 | Vonnahme .......... G06F 13/4068 |
| 2019/0089561 A1 | 3/2019 | Chen |

FOREIGN PATENT DOCUMENTS

| | | |
|---|---|---|
| CN | 201498984 U | 6/2010 |
| CN | 201854022 U | 6/2011 |
| CN | 102403702 A | 4/2012 |
| CN | 102646974 A | 8/2012 |
| CN | 202713455 U | 1/2013 |
| CN | 203352163 U | 12/2013 |
| CN | 103973336 A | 6/2014 |
| CN | 204361680 U | 5/2015 |
| CN | 105827247 A | 8/2016 |
| CN | 106210668 A | 12/2016 |
| CN | 107204361 A | 9/2017 |
| CN | 206595710 U | 10/2017 |
| CN | 207368658 U | 5/2018 |
| CN | 207995240 U | 10/2018 |
| CN | 108767838 A | 11/2018 |
| CN | 109217279 A | 1/2019 |
| CN | 109786471 A | 5/2019 |
| CN | 110401180 A | 11/2019 |
| CN | 110401181 A | 11/2019 |
| EP | 1303004 A2 | 4/2003 |
| EP | 3128633 A1 | 2/2017 |

OTHER PUBLICATIONS

Written Opinion in PCT/CN2020/082124 dated Jun. 30, 2020, 5 pages.
First Office Action in Chinese Application No. 201910587726.2 dated Dec. 22, 2020, 15 pages.
First Office Action in Chinese Application No. 201910596669.4 dated Jan. 6, 2021, 18 pages.
The Extended European Search Report in European Application No. 20834195.8 dated Jun. 15, 2022, 8 pages.

* cited by examiner

ELECTRICAL SURGE PROTECTION CIRCUITS

CROSS-REFERENCE TO RELATED APPLICATIONS

This application is a Continuation of International Application No. PCT/CN2020/082124, filed on Mar. 30, 2020, which claims priority to Chinese Patent Application No. 201910587726.2 filed on Jul. 2, 2019, and Chinese Patent Application No. 201910596669.4 filed on Jul. 2, 2019, the contents of which are hereby incorporated by reference to its entirety.

TECHNICAL FIELD

The present application generally relates to circuit technology, and more particularly, to electrical surge protection circuits.

BACKGROUND

Power over Coaxia (PoC) technique may be widely used in data signal (e.g., a network signal, a video signal, an image signal, an audio signal) and power signal transmission. In a PoC system, a power supply equipment and a powered device may exchange a data signal and a power signal via a coaxial cable. An electrical surge may sometimes occur between the power supply equipment and the powered device. The electrical surge refers to a transient overvoltage of an electric device that exceeds a steady value, which degrades wiring insulation and destroys the electronic device. The electrical surge may be generated by an internal cause (e.g., a start, a stop, or a malfunction of the electronic device), and/or an external cause (e.g., a lightning strike). Thus, it is desirable to provide an electrical surge protection circuit for the PoC system, thereby avoiding the electrical surge being damaged by the electrical surge.

SUMMARY

According to the present disclosure, a circuit is provided. The circuit may include a coaxial cable interface, a data module, a power module, a power signal transmission branch, and a data signal transmission branch. The data module may be configured to receive or output a data signal. The power module may be configured to receive or output a power signal. The power signal transmission branch may be electrically coupled between the coaxial cable interface and the power module. The power signal transmission branch may include an inductor that allows the power signal to pass. The data signal transmission branch may be electrically coupled between the coaxial cable interface and the data module. The data signal transmission branch may include a capacitor that allows the data signal to pass and a first electrical surge protection circuit configured to release a surge current on the data signal transmission branch.

In some embodiments, the circuit may include a common branch electrically coupled between the coaxial cable interface and a connection node between the power signal transmission branch and the data signal transmission branch.

In some embodiments, the first electrical surge protection circuit may include a first protection device. One end of the first protection device may be coupled to the capacitor, and another end of the first protection device may be coupled to the ground.

In some embodiments, the first protection device may include a gas discharge tube (GDT), a transient voltage suppressor (TVS), and a voltage switched transient voltage suppressor.

In some embodiments, the data signal transmission branch may include a second electrical surge protection circuit and a resistor. The data module may be coupled to the coaxial cable interface via the second electrical surge protection circuit, the resistor, the first electrical surge protection circuit, and the capacitor sequentially.

In some embodiments, one end of the second electrical surge protection circuit may be coupled to the resistor, and another end of the second electrical surge protection circuit may be coupled to the ground.

In some embodiments, the second electrical surge protection circuit may include a TVS.

In some embodiments, a clamping voltage of the first electrical surge protection circuit may be greater than a clamping voltage of the second electrical surge protection circuit.

In some embodiments, a power consumption of the first electrical surge protection circuit may be greater than a power consumption of the second electrical surge protection circuit.

In some embodiments, a capacitance of the TVS is smaller than 1 pF.

In some embodiments, the power signal transmission branch may include a third electrical surge protection circuit. The power module may be coupled to the coaxial cable interface via the third electrical surge protection circuit and the inductor sequentially.

In some embodiments, one end of the third electrical surge protection circuit may be coupled to the inductor, and another end of the third electrical surge protection circuit may be coupled to the ground.

In some embodiments, the third electrical surge protection circuit may include a third protection device and a rectifier bridge.

In some embodiments, the third protection device may include a TVS.

In some embodiments, the circuit may include a fourth electrical surge protection circuit configured to release an electrical surge on the common branch. One end of the fourth electrical surge protection circuit may be coupled to the common branch, and another end may be coupled to the ground.

In some embodiments, the fourth electrical surge protection circuit may include a fourth protection device and a GDT connected sequentially.

In some embodiments, the fourth protection device may include a TVS or a varistor.

In some embodiments, a working voltage of the TVS may be smaller than a working voltage of the varistor.

In some embodiments, a capacitance of the GDT is smaller than a capacitance of the TVS.

In some embodiments, the capacitance of the GDT may be smaller than 1 pF.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to a circuit. The circuit may include a coaxial cable interface, a data module, a power module, a power signal transmission branch, and a data signal transmission. The data module may be configured to receive or output a data signal. The power module may be configured to receive or output a power signal. The power signal transmission branch may be electrically coupled between the coaxial cable interface and the power module, and include an inductor that allows the power signal to pass. The data signal transmission branch may be electrically coupled between the coaxial cable interface and the data module. The data signal transmission branch may include a capacitor that allows the data signal to pass and a first electrical surge protection circuit configured to release a surge current on the data signal transmission branch.

According to some embodiments, a fourth electrical surge protection circuit may be coupled to a common branch, which is coupled between the coaxial cable interface and a connection node between the power signal transmission branch and the data signal transmission branch. Similar to the function of the first electrical surge protection circuit, the fourth electrical may be configured to release an electrical surge on the common branch. According to some embodiments, the data signal transmission branch may further include a second electrical surge protection circuit configured to release a residual electrical surge after the electrical surge releasing performed by the fourth electrical surge protection circuit and/or the first electrical surge protection circuit. The data module may be coupled to the coaxial cable via the second electrical surge protection circuit, the first electrical surge protection circuit and the capacitor sequentially, thereby protecting the data module from an electrical surge more reliably. According to some embodiments, the power signal transmission branch may include a third electrical surge protection circuit coupled between the coaxial cable interface and the power module. The third surge protection circuit may be configured to release an electrical surge received from the connection node, thereby protecting the power module from an electrical surge more reliably. In some conditions, one or more (e.g., the third and/or fourth electrical surge protection circuits) of the abovementioned electrical surge protection circuits may include a GDT or a rectifier bridge that is connected sequentially to a protection device of the corresponding electrical surge protection circuit, which reduces a parasitic capacitance in the corresponding electrical surge protection circuit, thereby reducing an affect of the parasitic capacitance on the data signal.

Figure 1:
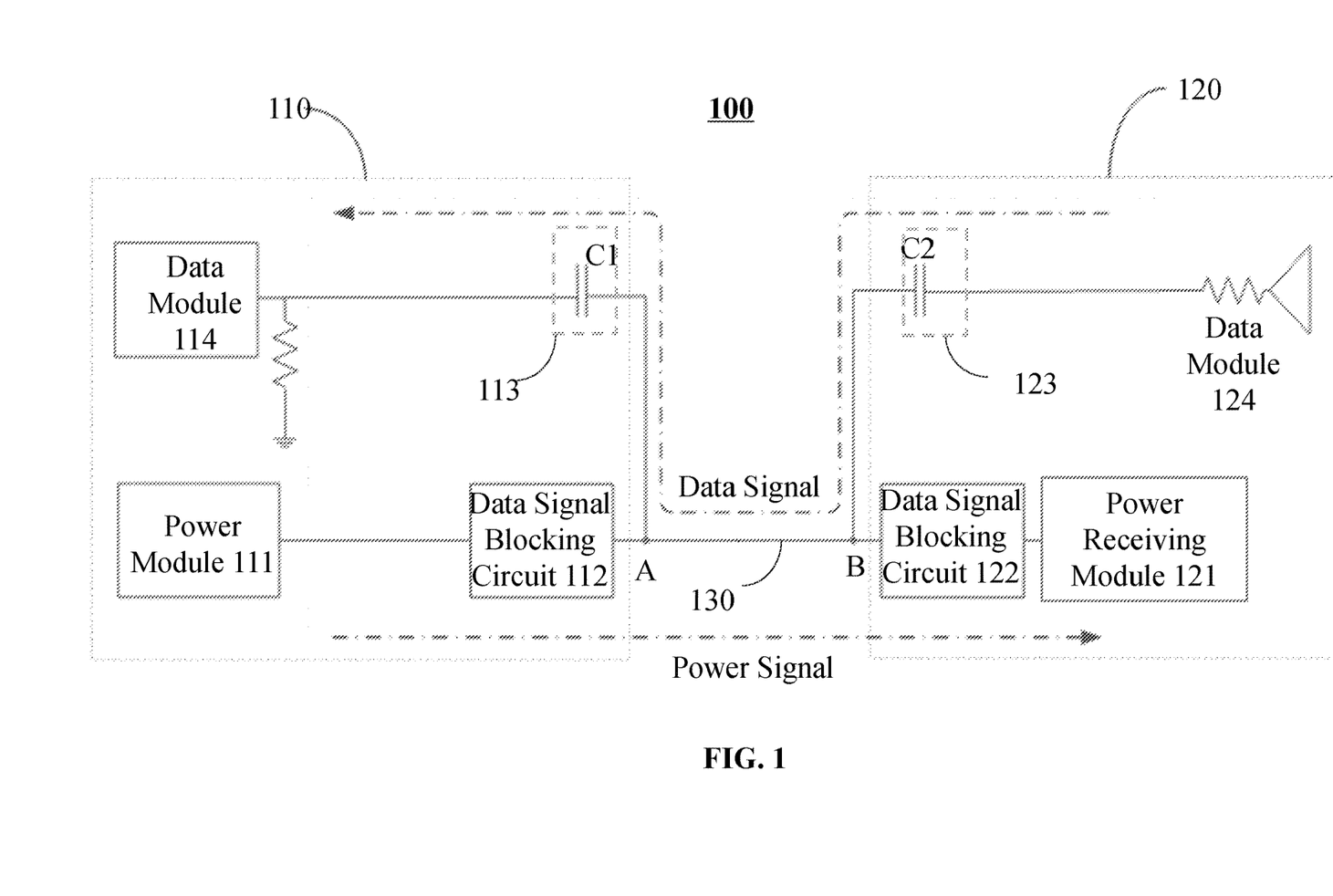
FIG. 1 is a schematic diagram of an exemplary POC system according to some embodiments of the present disclosure.

FIG. 1 illustrates a schematic diagram of an exemplary Power over Coaxial (PoC) system 100 according to some embodiments of the present disclosure. The PoC system 100 may use a single coxial cable to transmit both of the power signal and the data signal, which reduces the wiring cost and improves the convenience and security for installing the components of the PoC system 100. As used herein, the power signal may include a direct current (DC) signal. The data signal may include one or more alternating current (AC) signals (e.g., a network signal, a video signal, an image signal, an audio signal). As shown in FIG. 1, the PoC system 100 may include a power sourcing equipment (PSE) 110, a powered device (PD) 120, and a coaxial cable 130. The PSE 110 may be electrically coupled to the PD 120 via the coaxial cable 130. The coaxial cable 130 may be coupled to the PSE 110 via a connection node A, and coupled to the PD 120 via a connection node B.

The PSE 110 may be configured to supply electric power to the PD 120. In some embodiments, the PSE 110 may be used to manage a power supply process in the PoC system 100. The PSE 110 may have a similar function as a network switch (e.g., a Power over Ethernet (PoE) network switch) that supplies power to powered devices. In some embodiments, the PES 110 may be also used to obtain and process the data signal from the PD 120. For example, the PSE 110 may include a digital video recorder that receives the video signal from the PD 120 and performs a video processing operation on the video signal.

As shown in FIG. 1, the PSE 110 may include a power module 111, a data signal blocking circuit 112, a power signal blocking circuit 113, and a data module 114. The power module 111 may be configured to provide a power signal for the PoC system 100 or a component (e.g., the PSE 110, the PD 120) thereof. The power module 111 may include a power source or a power adapter coupled to an external power source. The data signal blocking circuit 112 and the power signal blocking circuit 113 may be used to separate the power signal and the data signal, respectively. For example, the data signal blocking circuit 112 may allow the power signal to pass through while block the data signal, such that no data signal may reach at the power module 111. In some embodiments, the power signal may be a DC signal and the data signal may be an AC signal. The data signal blocking circuit 112 may include an inductor (e.g., an inductor L shown in FIGS. 2-6), which presents low impedance to a DC signal, and high impedance to an AC signal. Thus, the data signal blocking circuit 112 may allow the power signal to pass and block the AC signal (e.g., the data signal). As another example, the power signal blocking circuit 113 may allow the data signal to pass through while block the power signal, such that no power signal may reach at the data module 114. The power signal blocking circuit 113 may include a capacitor C1, which presents low impedance to an AC signal, and high impedance to an DC signal. Thus, the power signal blocking circuit 113 may allow the data signal to pass and block the DC signal (e.g., the power signal). As shown in FIG. 1, the left end of the capacitor C1 may be coupled to the data module 114, and the right end of the capacitor C1 may be coupled to the connection node A. The data module 114 may be configured to process the data signal, which is received from the PD 120 and passed by the power signal blocking circuit 113. For example, the data module 114 may store a video signal obtained from the PD 120. As another example, the data module 114 may perform a video processing operation (e.g., a lowpass filtering, a video compensation) on the video signal. In some embodiments, the power module 111 and the data module 114 may be integrated into one module.

The PD 120 may be a device that is powered to realize certain functions, e.g., implementing the video surveillance. For example, the PD 120 may be powered by the PSE 110 by receiving the power signal via the coaxial cable 130, or the PD 120 may be powered by an external power source (not shown in FIG. 1) via other cables. The PD 120 may be a terminal device of the PoC system 100 that may generate the data signal and transmit the data signal to the PSE 110 for further processing. In some embodiments, the PD 120 may be a PoC device that supports a PoC technique or a non-PoC device which does not support the PoC technique. The PoC technique may refer to an operation of exchanging both of the power signal and the data signal between two devices via a coaxial cable. In some embodiments, the PD 120 may include an IP phone, a notebook computer, an IP camera, a Wireless Local Area Network access point (not shown in FIG. 1), or the like, or a combination thereof.

As shown in FIG. 1, the PD 120 may include a power receiving module 121, a data signal blocking circuit 122, a power signal blocking circuit 123, and a data module 124. The power receiving module 121 may receive the power signal via the coaxial cable 130 and the data signal blocking circuit 122, as indicated by the dashed-dotted arrowed line indicative of a power signal transmission direction, and power on the data module 124. The data signal blocking circuit 122 may have a similar function and/or configuration with that of the data signal blocking circuit 112. For example, the data signal blocking circuit 122 may allow the power signal to pass through and block the data signal, such that no data signal may reach the power receiving module 121 via the data signal blocking circuit 122. The power signal blocking circuit 123 may have a similar function and/or configuration with that of the power signal blocking circuit 113. For example, the power signal blocking circuit 123 may allow the data signal to pass through and block the power signal, such that no power signal may reach the data module 124. As shown in FIG. 1, the power signal blocking circuit 123 may include a capacitor C2. The data module 124 may be configured to generate the data signal or receive the data signal from a signal source. The data module 124 or the signal source may include an image sensor, a video sensor, an audio sensor, or the like. For example, the video sensor may be part of a video surveillance system and generate a video signal corresponding to a specific scene. The data module 124 may transmit the data signal to the PSE 110 via the power signal blocking circuit 123 and the coaxial cable 130, as indicated by the dashed-dotted arrowed line indicative of a data signal transmission direction. In some embodiments, the power receiving module 121 and the data module 124 may be two components integrated into the PD 120 (e.g., a camera). Alternatively or additionally, the power receiving module 121 and the data module 124 may be independent devices that are connected with each other. For example, the data module 124 may be a camera that includes a port for connecting with the power receiving module 121.

The coaxial cable 130 may be configured to exchange the power signal and/or the data signal between the PSE 110 and the PD 120. As shown in FIG. 1, according to the dashed-dotted arrowed line indicative of the power signal transmission direction, the power signal may be transmitted from the power module 111, via the data signal blocking circuit 112, the node A, the coaxial cable 130, the node B, and the data signal blocking circuit 122 sequentially, and received by the power receiving module 121. According to the dashed-dotted arrowed line indicative of the data signal transmission direction, the data signal may be outputted by the data module 124, via the power signal blocking circuit 123, the node B, the coaxial cable 130, the node A, and the power signal blocking circuit 113 sequentially, and received by the data module 114. The coaxial cable 130 may be an RG-6 coaxial cable, a 75-5 coaxial cable, an RG-59 coaxial cable, an RG-58 coaxial cable, an RG-62 coaxial cable, an RG-7 coaxial cable, an RG-11 coaxial cable, or the like, or a combination thereof.

It should be noted that the above description of the PoC system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the PoC system 100 may include one or more additional components. Additionally or alternatively, one or more components of the PoC system 100 described above may be omitted. As another example, two or more components of the PoC system 100 may be integrated into a single component.

FIGS. 2-6 illustrates schematic diagrams of exemplary electrical surge protection circuits according to some embodiments of the present disclosure. As used herein, an electrical surge refers to a transient transition in voltage, current, or transferred energy in an electric device that exceeds a steady value. The electrical surge may include a surge voltage and a surge current. A surge voltage refers to an overvoltage spike applied on the electrical device that exceeds a normal operation voltage of the electric device. A surge current refers to an overcurrent spike drawn by the electrical device that exceeds a normal operation current of the electric device. In essence, the electrical surge may be a violent pulse that occurs in just a few millionths of a second, which is possibly caused by a heavy equipment, a short circuit, a power switching, a large engine, and lightning induced energy. In such cases, an electrical surge protection circuit may be introduced to protect the PoC system (e.g., the PoC system 100) from being damaged by the electrical surge. For illustration purposes, the electrical surge protection circuits 200-600 hereinafter are illustrated to protect the PSE 110 from the electrical surge. In some alternative embodiments, it shall be noted that the electrical surge protection circuits 200-600 may also be integrated into a powered device (e.g., the PD 120) to protect the powered device from the electrical surge in a similar manner, which is not to be repeated in the disclosure.

Figure 2:
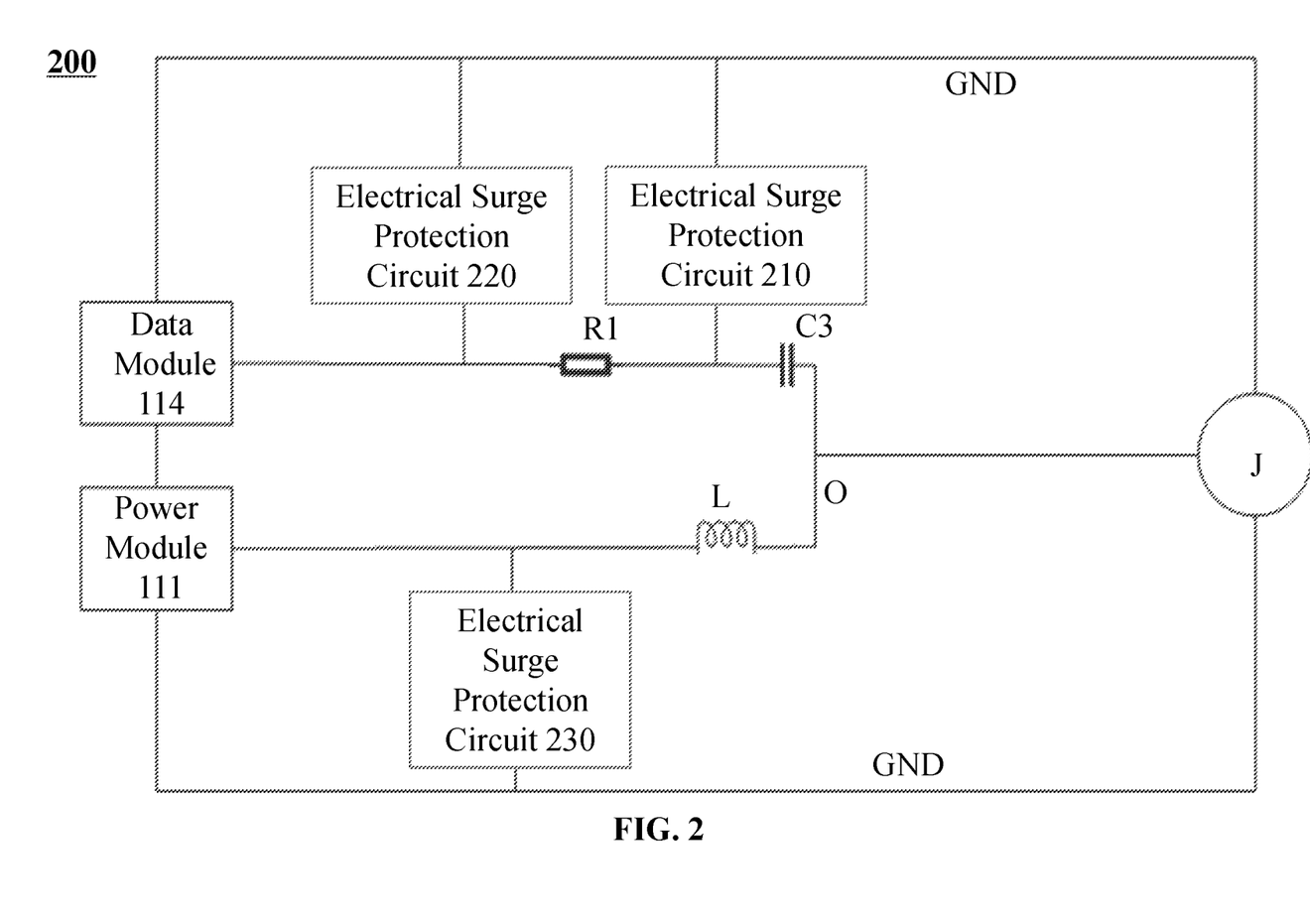
FIG. 2 illustrates a schematic diagram of an exemplary electrical surge protection circuit according to some embodiments of the present disclosure.

FIG. 2 illustrates a schematic diagram of an exemplary electrical surge protection circuit 200 according to some embodiments of the present disclosure. The electrical surge protection circuit 200 may include a coaxial cable interface J, a data signal transmission branch, a power signal transmission branch, and a common branch. The data signal transmission branch may be electrically coupled between the coaxial cable interface J and the data module 114. As shown in FIG. 2, the data signal transmission branch includes a capacitor C3, an electrical surge protection circuit 210 (also referred as to a first electrical surge protection circuit), a resistor R1, and an electrical surge protection circuit 220 (also referred as to a second electrical surge protection circuit). The power signal transmission branch may be electrically coupled between the coaxial cable interface J and the power module 111. As shown in FIG. 2, the power signal transmission branch includes an inductor L and an electrical surge protection circuit 230 (also referred as to a third electrical surge protection circuit). The common branch may be electrically coupled between the coaxial cable interface J and a connection node O between the power signal transmission branch and the data signal transmission branch.. That is to say, the coaxial cable interface J is coupled to the data module 114 via the common branch and the data signal transmission branch, and coupled to the power module 111 via the common branch and the power signal transmission branch.

The coaxial cable interface J may be configured to receive a coaxial cable of a PoC system (e.g., the coaxial cable 130 of the PoC system 100 in FIG. 1). The coaxial cable interface J may be coupled between the PSE 110 and a powered device (e.g., PD 120). Via the coaxial interface J, the power signal may be transmitted from the common branch to the powered device, and the data signal generated by the powered device may be transmitted to the common branch for further transmission.

The data signal transmission branch may be configured to transmit the data signal from the common branch to the data module 114. In the data signal transmission branch, the data module 114 may be coupled to the coaxial cable interface J via the electrical surge protection circuit 220, the resistor R1, the electrical surge protection circuit 210, and the capacitor C3 sequentially. One end of the electrical surge protection circuit 210 may be coupled to the capacitor C3, and another end of the electrical surge protection circuit 210 may be coupled to the ground. One end of the electrical surge protection circuit 220 may be coupled to the resistor R1, and another end of the electrical surge protection circuit 220 may be coupled to the ground.

The capacitor C3 may be configured to allow the data signal to pass and block the power signal (i.e., an AC coupling), such that no power signal in the DC form may reach the data signal transmission branch. In some embodiments, the capacitor C3 may have a relatively large capacitance, e.g., 100 microfarads (pF). Since a capacitor with large capacitance presents a low impedance to a surge current, the surge current may pass through the capacitor C3 easily. Thus, the electrical surge protection circuit 210 set between the capacitor C3 and the data module 114 may be configured to release the surge current. In some embodiments, when an electrical surge comes in the common branch of the electrical surge protection circuit 200 via the coaxial cable interface J, most of the electrical surge may pass through the capacitor C3, and be released at least partially by the electrical surge protection circuit 210. Thus, due to the electrical surge released by the electrical surge protection circuit 210, a voltage on the common branch may be smaller than a threshold. In some embodiments, the electrical surge coming in the electrical surge protection circuit 200 via the coaxial cable interface J may include the electrical surge flowing to the data signal transmission branch (also referred to as first electrical surge) and an electrical surge flowing to the power signal transmission branch (also referred to as third electrical surge). Since a majority of the electrical surge on the common branch flows to the data signal transmission branch due to the large-capacitance capacitor C3, the third electrical surge may be relatively small, thus protecting the power signal transmission branch to some extent. In some embodiments, if the first electrical surge is of a low surge voltage, the electrical surge protection circuit 210 may reduce the surge voltage to a desirable level, thereby protecting a subsequent branch of the data signal transmission branch after the electrical surge protection circuit 210 from a damage brought by the first electrical surge.

The resistor R1 may be configured to perform an impedance matching between a data module of the powered device (e.g., the data module 124 of the PD 120) and the data module 114, so as to maximize a power transfer from the powered device to the data module 114. The resistor R1 may be further configured to control a voltage applied on a subsequent path of the data signal transmission branch after the resistor R1. The electrical surge protection circuit 220 may be configured to release a second electrical surge remained after an electrical surge releasing performed by the electrical surge protection circuit 210. In some embodiments, the second electrical surge may also be referred as a residual electrical surge. In some embodiments, a clamping voltage of the electrical surge protection circuit 210 may be set to be greater than a clamping voltage of the electrical surge protection circuit 220. An operation voltage of an electrical surge protection device (e.g., a gas discharge tube (GDT), a transient voltage suppressor (TVS), a thyristor surge suppressor (TSS), a varistor) refers to a voltage that causes the electrical surge protection device to start to short or clamp. A clamping voltage of the electrical surge protection device (or an electrical surge protection circuit including the electrical surge protection device) refers to a certain voltage that the electrical surge protection device is limited to, after the electrical surge protection device has shorted or clamped. At the clamping voltage, the electrical surge protection device may pass a relatively large current flow. The clamping voltage of the electrical surge protection device may be greater than the operation voltage thereof. A working voltage of the electrical surge protection device refers to a voltage at which the electrical surge protection device is designed to work. The working voltage of the electrical surge protection device is always smaller than the operation voltage thereof. At a voltage equal to or smaller than the working voltage, the electrical surge protection device may be kept from shorting. In some embodiments, the electrical surge protection device for protecting a circuit from the electrical surge may have an working voltage that has a correlation (e.g., a linear correlation) with a working voltage of the protected circuit. For example, the working voltage of the electrical surge protection device may be substantially equal to a product of the working voltage of the protected circuit and a suitable value (e.g., 1.2, 1.3). The suitable value may be estimated based on experience. In some embodiments, the working voltage of the electrical surge protection device may include a breakdown voltage (also referred to as a DC spark-over voltage) of the GDT, an off-state voltage (also referred to as a stand-off voltage) of the TVS or the TSS, an allowable voltage of the varistor, or the like. Since the electrical surge protection circuit 210 may release most of the electrical surge on the data signal transmission branch, the power consumption of the electrical surge protection circuit 210 may be greater than the power consumption of the electrical surge protection circuit 220.

The power signal transmission branch may be configured to transmit the power signal from the power module 111 to the common branch for powering the powered device, or to the data signal transmission branch for powering the data module 114. In the power signal transmission branch, the power module 111 may be coupled to the coaxial cable interface J via the electrical surge protection circuit 230 and the inductor L sequentially. One end of the electrical surge protection circuit 230 may be coupled the inductor L, and another end of the electrical surge protection circuit 230 may be coupled to the ground. The inductor L may be configured to allow the power signal in the DC form to pass and block the data signal, thus preventing an undesired coupling caused by the electrical surge coming from the common branch. In some embodiments, the inductor L may be a hundred-microhenry (pH) level inductor. The electrical surge protection circuit 230 may be configured to release the third electrical surge, so as to protect the power module 111 from a damage caused by the third electrical surge.

The common branch may be configured to transmit the data signal received via the coaxial cable interface J to the data signal transmission branch, and transmit the power signal received from the power signal transmission branch to the coaxial interface J. That is, a signal on the common branch may be a combination of the power signal and the data signal (e.g., a high definition video signal).

Figure 3:
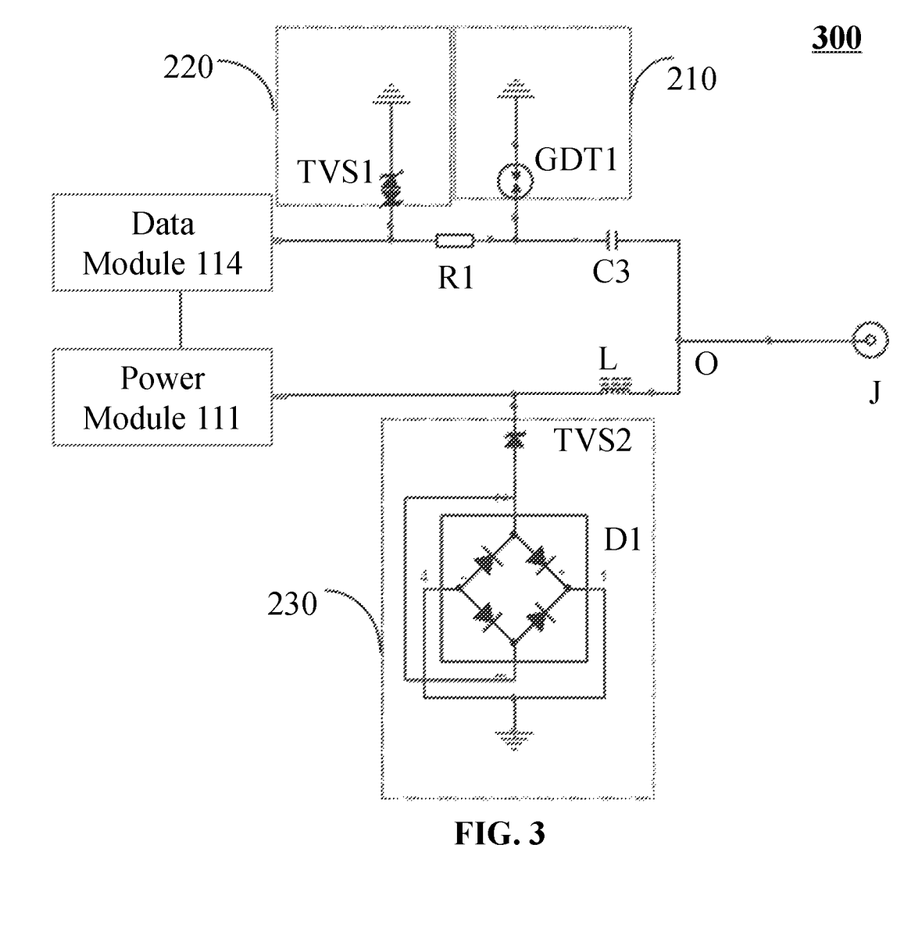
FIG. 3 illustrates a schematic diagram of another exemplary electrical surge protection circuit according to some embodiments of the present disclosure.

FIG. 3 illustrates a schematic diagram of another exemplary electrical surge protection circuit 300 according to some embodiments of the present disclosure. The electrical surge protection circuit 300 may be an exemplary embodiment of the electrical surge protection circuit 200 as described in connection with FIG. 2. As shown in FIG. 3, the electrical surge protection circuit 210 may include a first protection device, wherein one end of the first protection device is coupled to the capacitor C3, and another end of the first protection device is coupled to the ground. The electrical surge protection circuit 220 may include a second protection device, one end of the second electrical surge protection circuit is coupled to the resistor R1, and another end of the second electrical surge protection circuit is coupled to the ground. The electrical surge protection circuit 230 may include a third protection device and a rectifier that are connected in series, wherein one end of the third protection device is coupled to the inductor L, and another end of the third protection device is coupled to a rectifier bridge D1.

In some embodiments, the first protection device may include a gas discharge tube (GDT), a transient voltage suppressor (TVS) (e.g., an unidirectional TVS), a thyristor surge suppressor (TSS, also referred to as a voltage switched transient voltage suppressor), a varistor, or the like, or any combination thereof. For example, if the first protection device includes or is the GDT, the GDT may create a short circuit to release the first electrical surge, once triggered by the first electrical surge. The GDT may continue conducting (called a follow-on current) until all electric current on the data transmission branch sufficiently diminishes and the gas discharge quenches. Since the first protection device is coupled to the data signal transmission branch that filers out the power signal, the GDT may be protected from the follow-on current remained after the first electrical surge has been released by the GDT, which may destroy the GDT (e.g., causing the GDT to overheat). As another example, if the first protection device includes or is the TVS, a resistance between two ends of the TVS may be changed from high to low extremely quickly to release the first electrical surge, once the TVS is subjected to the first electrical surge. The TVS may have a high electrical surge absorbing capability. In some embodiments, the parasitic capacitance of the first protection device may need to satisfy a certain condition, and a power of the first electrical surge may be smaller than a maximum power that the first protection device is able to release. Since the parasitic capacitance may damage a high-frequency data signal, the smaller the capacitance of the first protection device is, the better the data transmission branch may be. Merely by way of example, the certain condition for the parasitic capacitance of the first protection device may include that the parasitic capacitance of the first protection device is smaller than a certain value. In some embodiments, the GDT usually has a small parasitic capacitance (for example, smaller than 1 picofarad (pF)). If the first protection device includes the GDT, the first protection device may be regarded as satisfying the certain condition. In some embodiments, the parasitic capacitance of the TVS or TSS has a positive correlation with a current flow capacity, that is, the greater electrical surge current the TVS or the TSS is able to release, the greater the parasitic capacitance of the TVS or TSS may be. If the first protection device includes the TVS or TSS, the parasitic capacitance of the first protection device may need to be smaller than the certain value (e.g., 10 pF), and the power of the first protection device may need to be greater than the power of the first electrical surge. In some embodiments, the working voltage of the first protection device may need to be greater than a voltage of the data signal transmitted on the data signal transmission branch, to ensure that the first protection device does not short due to a voltage fluctuation of the data signal within its normal voltage range. In this way, an electrical surge protection device may be selected from one or more electrical surge protection devices as the first protection device, by comparing the voltage of the data signal with working voltage levels of one or more electrical surge protection devices. As described above, there may be a correlation between a value of the working voltage of the electrical surge protection device and a value of the working voltage of the protected circuit. In some embodiments, an electrical surge protection device may be selected from one or more electrical surge protection devices as the first protection device, by determining a product of the voltage of the data signal and a suitable value, and comparing the determined product with the working voltage levels of one or more electrical surge protection devices. For example, the working voltage of the first protection device may be a smallest working voltage level of its type (e.g., the above-mentioned GDT, TSS, TVS) that is greater than a product of the voltage of the data signal and the suitable value, since an electrical surge protection with a smaller working voltage level has a better electrical surge releasing performance. For illustration, the voltage of the data signal transmitted on the data signal transmission branch is equal to 3.3 volts (V) hereinafter. In some embodiments, the first protection device may be a GDT with a breakdown voltage equal to 90 V and a capacitance smaller than 1 pF. In some embodiments, the first protection device may be a TSS with an off-state voltage equal to 6V and a capacitance smaller than 10 pF. In some embodiments, the first protection device may be a TVS with an off-state voltage equal to 5V and a capacitance smaller than 10 pF, or the like. As shown in FIG. 3, the first protection device is a GDT1.

In some embodiments, the second protection device may include a TVS, e.g., a TVS1 in FIG. 3. Similar to the first protection device, a working voltage of the second protection device may need to be greater than the voltage of the data signal transmitted on the data signal transmission branch. Also, a parasitic capacitance of the TVS1 may be smaller than a certain value (e.g., 10 pF). Since the second protection device is used to release the electrical surge remained after the electrical surge releasing of the first protection device, the second protection device may have a lower power consumption than that of the first protection device, and the working voltage of the second protection device may be smaller than that of the first protection device to achieve a better electrical surge releasing performance. For example, the TVS1 may have an off-state voltage equal to the voltage of the data signal (i.e., 3.3V) and a capacitance smaller than 1 pF.

In some embodiments, the third protection device may include a TVS, e.g., a TVS2 in FIG. 3. In some embodiments, a working voltage of the third protection device may be greater than a voltage of the power signal transmitted on the power signal transmission branch. Optionally, a difference between the working voltage of the third protection device and the voltage of the power signal may be as small as possible. For illustration, the voltage of the power signal transmitted on the power signal transmission branch is equal to 48V hereinafter. In some embodiments, an off-state voltage of the TVS2 may be equal to 58V. Referring back to FIG. 1, a POC line may include the common branch, a line between the capacitor C1 and the connection node A, a line between the data signal blocking circuit 112 and the connection node A, a line between the capacitor C2 and the connection node B, a line between the data signal blocking circuit 122 and the connection node B. Since the third electrical surge protection circuit 230 is close to the POC line, a first data signal (e.g., a high-frequency data signal thereof) transmitted on the POC line may be attenuated by the parasitic capacitance of the electrical surge protection circuit 230. Thus, a second data signal received by the data module 114 via the data signal transmission branch may be different from the first data signal. To improve the quality of the second data signal, the parasitic capacitance of the electrical surge protection circuit 230 may need to be decreased. To this end, the TVS2 may be coupled to the rectifier bridge D1 that has a capacitance smaller than that of the TVS2, which reduces the parasitic capacitance in the electrical surge protection circuit 230 to be smaller than the capacitance of the rectifier bridge D1. The rectifier bridge may include a full-bridge rectifier and a half-bridge rectifier, which reduces the parasitic capacitance in the electrical surge protection circuit 230 and has a desirable current flow capacity. For example, as shown in FIG. 3, the rectifier bridge is a full-bridge rectifier D1 composed of four diodes. As another example, the rectifier bridge may also be composed of two diodes connected in parallel, wherein directions (poles) of the two diodes are opposite. Due to a low clamping voltage of the TVS2, the rectifier bridge D1 may have a low voltage drop for conducting, thereby avoiding the subsequent branch of the power signal transmission branch being affected by an electrical surge remained after an electrical surge releasing performed by the electrical surge protection circuit 230.

Figure 4:
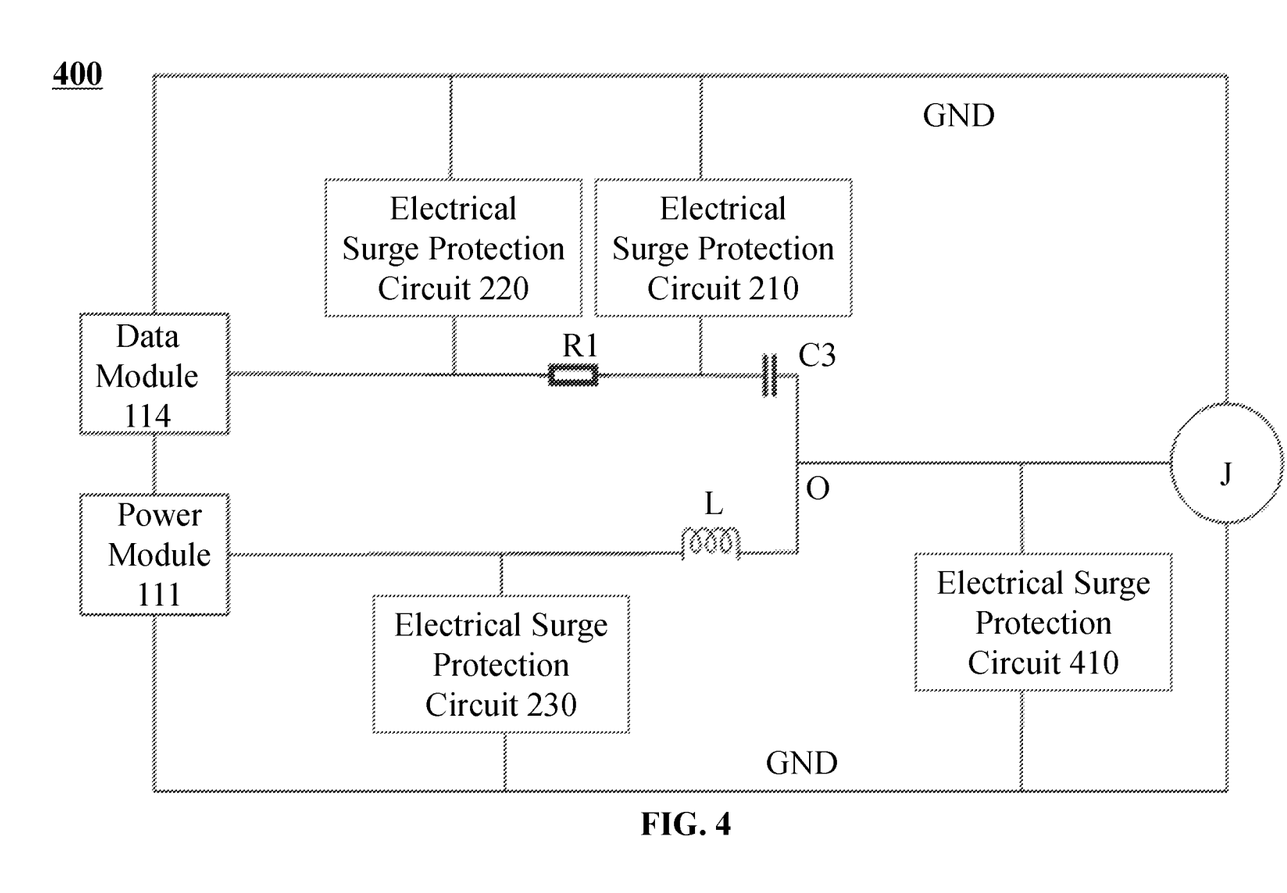
FIG. 4 illustrates a schematic diagram of another exemplary electrical surge protection circuit according to some embodiments of the present disclosure.

FIG. 4 illustrates a schematic diagram of another exemplary electrical surge protection circuit 400 according to some embodiments of the present disclosure. The electrical surge protection circuit 400 may be similar to the electrical surge protection circuit 200 as described in connection with FIG. 2, except that the electrical surge protection circuit 400 may further include an electrical surge protection circuit 410 (also referred as to a fourth electrical surge protection circuit). One end of the electrical surge protection circuit 410 may be coupled to the common branch, and another end of the electrical surge protection circuit 410 may be coupled to the ground.

The electrical surge protection circuit 410 may be configured to release an electrical surge on the common branch. In such case, the electrical surge may be firstly reduced by the electrical surge releasing by the electrical surge protection circuit 410, and then form the first electrical surge and the second electrical surge as described above. Once the electrical surge comes in the common branch via the coaxial cable interface J, the electrical surge protection circuit 410 may absorb a surge current and suppress a surge voltage to a lower level, which protects subsequent branches (i.e., the data signal transmission branch and the power signal transmission branch) from damaging, and avoids an overvoltage on the coaxial cable (e.g., the coaxial cable 130) connected to the coaxial interface J. In some embodiments, if the electrical surge coming in the common branch is high, the electrical surge protection circuit 410 may effectively avoid an arc discharge generated by an electrical breakdown of air that is caused by the electrical surge.

Figure 5:
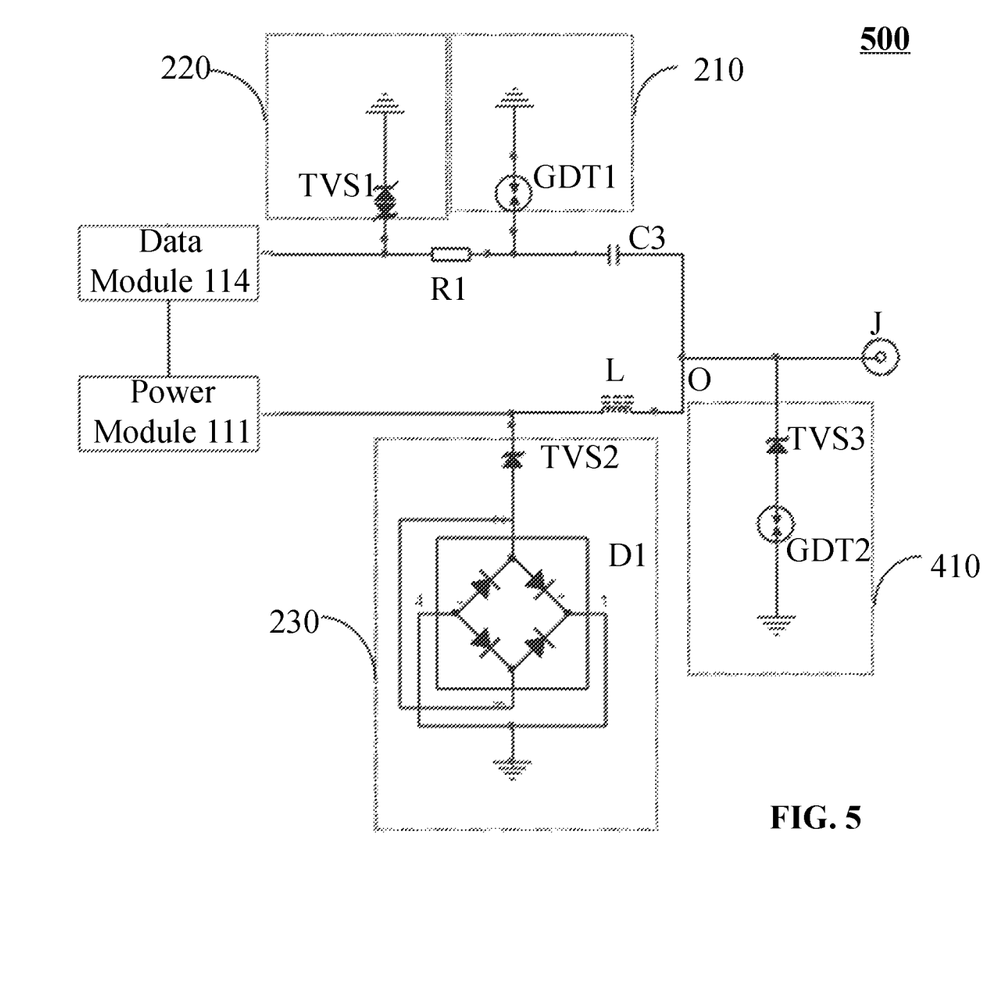
FIG. 5 illustrates a schematic diagram of another exemplary electrical surge protection circuit according to some embodiments of the present disclosure.

FIG. 5 illustrates a schematic diagram of another exemplary electrical surge protection circuit 500 according to some embodiments of the present disclosure. The electrical surge protection circuit 500 may be an exemplary embodiment of the electrical surge protection circuit 400 as described in connection with FIG. 4. As shown in FIG. 5, the electrical surge protection circuit 500 may be similar to the electrical surge protection circuit 300 as described in connection with FIG. 3, except that the electrical surge protection circuit 500 may further include the electrical surge protection circuit 410. The electrical surge protection circuit 410 may include a fourth protection device and a GDT that are connected in series. The fourth protection device may include a TVS, a varistor, or the like. For example, as shown in FIG. 5, the electrical surge protection circuit 410 may include an unidirectional TVS3 and a GDT2. Similar to the first and second protection device(s), a working voltage of the fourth protection device may need to be greater than the voltage of the data signal transmitted on the common branch. As shown in FIG. 5, the first, second, or third protection device(s) releases an electrical surge remained after the electrical surge releasing of the fourth protection device, the working voltage of the fourth protection device may be greater than that of the first, second, or third protection device, so as to achieve a better electrical surge releasing performance. For illustration, the voltage of the power signal transmitted on the common branch is equal to 48V, and the voltage of the data signal transmitted on the common branch is equal to 3.3V hereinafter. In some embodiments, an off-state voltage of the TVS3 may be equal to 58V. As another example, since the electrical surge may undergo further electrical surge releasing performed by the electrical surge protection circuit(s) 210-230, the fourth protection device may be a varistor with a clamping voltage higher than the clamping voltage of the TVS3. In some embodiments, an allowable voltage of the varistor may be equal to 65 Vdc.

In some embodiments, the data signal transmitted on the common branch may include a high-frequency signal that is sensitive to parasitic capacitance. To reduce the influence on the transmission of the data signal, the electrical surge protection circuit 410 shall have a small capacitance. As described elsewhere in the present disclosure, the GDT usually has a small parasitic capacitance (typically, smaller than 1 pF). As a front-stage protection device coupled to the common branch, the TVS3 may have a large power and a large capacitance (typically, a hundred-pF level). A capacitance of the GDT2 may be smaller than a capacitance of the TVS3. By coupling the GDT2 to the TVS3 in series, the capacitance of the electrical surge protection circuit 410 may be reduced to be smaller than the capacitance of the GDT2, thereby improving the quality of data signal transmission. Merely by way of example, for the TVS3 with capacitance equal to 1000 pF and the GDT2 with capacitance smaller than 1 pF, the capacitance of the electrical surge protection circuit 410 may be lowered below 1 pF. Since the TVS3 may return to a high-resistance state after the electrical surge releasing, the GDT2 may be protected from a follow-on current. In some embodiments, the GDT2 may have a breakdown voltage equal to 90V and a capacitance smaller than 1 pF.

Figure 6:
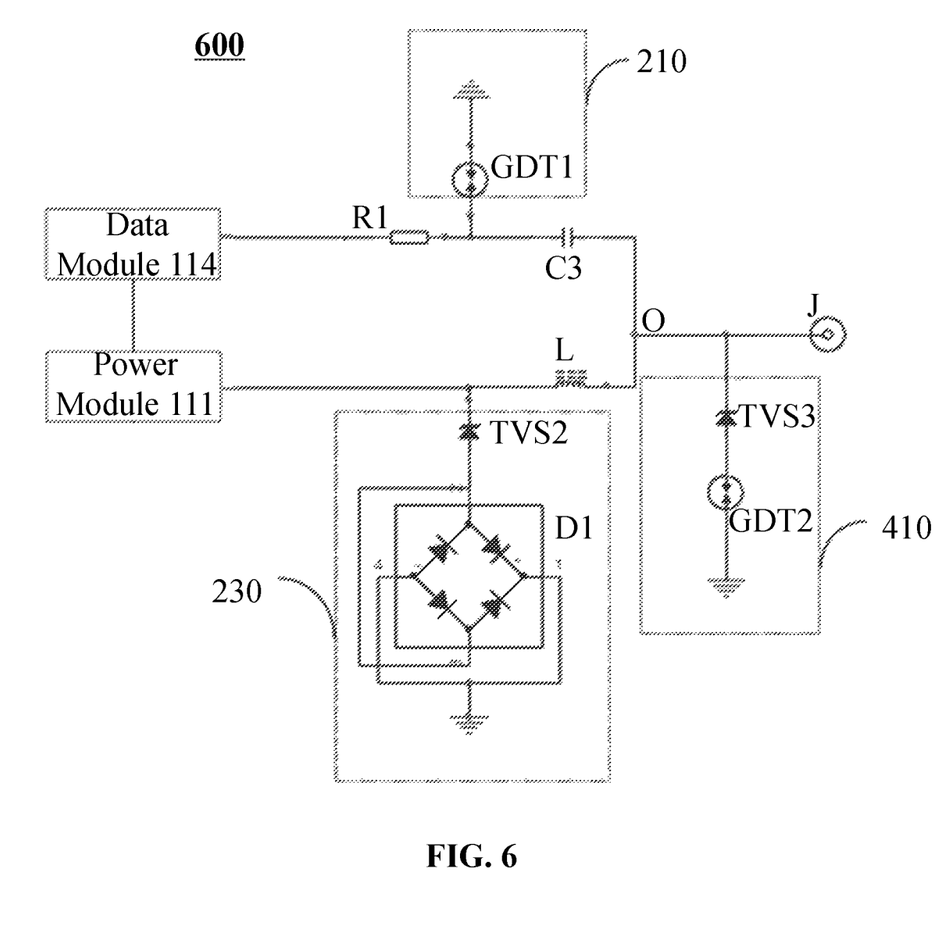
FIG. 6 illustrates a schematic diagram of another exemplary electrical surge protection circuit according to some embodiments of the present disclosure.

FIG. 6 illustrates a schematic diagram of another exemplary electrical surge protection circuit 600 according to some embodiments of the present disclosure. The electrical surge protection circuit 600 may be similar to the electrical surge protection circuit 500 as described in connection with FIG. 5, except that in the electrical surge protection circuit 600, the electrical surge protection circuit 220 is removed. In such case, in the data signal transmission branch, the electrical surge circuit 210 may release an electrical surge remained after a releasing of the electrical surge protection circuit 410 to a desired level.

It should be noted that the above descriptions of the electrical surge protection circuits 200-600 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, one or more of the electrical surge protection circuits 200-600 may include one or more additional components (e.g., one or more additional electrical surge protection circuit). Additionally or alternatively, one or more components of the one or more of the electrical surge protection circuits 200-600 described above may be omitted. For example, in the electrical surge protection circuits 400 or 500, the electrical surge protection circuit 210 may be removed. In some embodiments, the first, second, third, and fourth protection devices may include other components.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A circuit, comprising:
   a coaxial cable interface;
   a data module configured to receive or output a data signal;
   a power module configured to receive or output a power signal;
   a power signal transmission branch electrically coupled between the coaxial cable interface and the power module, wherein the power signal transmission branch includes an inductor that allows the power signal to pass; and
   a data signal transmission branch electrically coupled between the coaxial cable interface and the data module, wherein the data signal transmission branch includes a capacitor that allows the data signal to pass, a resistor, a first electrical surge protection circuit configured to release a surge current on the data signal transmission branch, and a second electrical surge protection circuit, wherein
   the data module is coupled to the coaxial cable interface via the second electrical surge protection circuit, the resistor, the first electrical surge protection circuit, and the capacitor sequentially.

2. The circuit of claim 1, further comprising:
   a common branch electrically coupled between the coaxial cable interface and a connection node between the power signal transmission branch and the data signal transmission branch.

3. The circuit of claim 1, wherein:
   the first electrical surge protection circuit includes a first protection device, one end of the first protection device being coupled to the capacitor, and another end of the first protection device being coupled to the ground.

4. The circuit of claim 3, wherein the first protection device includes a gas discharge tube (GDT), a transient voltage suppressor (TVS), or a voltage switched transient voltage suppressor.

5. The circuit of claim 1, wherein one end of the second electrical surge protection circuit is coupled to the resistor, and another end of the second electrical surge protection circuit is coupled to the ground.

6. The circuit of claim 1, wherein the second electrical surge protection circuit includes a TVS.

7. The circuit of claim 1, wherein:
a clamping voltage of the first electrical surge protection circuit is greater than a clamping voltage of the second electrical surge protection circuit.

8. The circuit of claim 1, wherein:
a power consumption of the first electrical surge protection circuit is greater than a power consumption of the second electrical surge protection circuit.

9. The circuit of claim 6, wherein a capacitance of the TVS is smaller than 1 pF.

10. The circuit of claim 1, wherein:
the power signal transmission branch further includes a third electrical surge protection circuit, the power module being coupled to the coaxial cable interface via the third electrical surge protection circuit and the inductor sequentially.

11. The circuit of claim 10, wherein one end of the third electrical surge protection circuit is coupled to the inductor, and another end of the third electrical surge protection circuit is coupled to the ground.

12. The circuit of claim 11, wherein the third electrical surge protection circuit includes a third protection device and a rectifier bridge.

13. The circuit of claim 12, wherein the third protection device includes a TVS.

14. The circuit of claim 2, further comprising:
a fourth electrical surge protection circuit configured to release an electrical surge on the common branch, one end of the fourth electrical surge protection circuit being coupled to the common branch, and another end being coupled to the ground.

15. The circuit of claim 14, wherein the fourth electrical surge protection circuit includes a fourth protection device and a GDT connected sequentially.

16. The circuit of claim 15, wherein the fourth protection device includes a TVS or a varistor.

17. The circuit of claim 16, wherein a working voltage of the TVS is smaller than a working voltage of the varistor.

18. The circuit of claim 16, wherein a capacitance of the GDT is smaller than a capacitance of the TVS.

19. The circuit of claim 18, wherein the capacitance of the GDT is smaller than 1 pF.

* * * * *